United States Patent
Sweazey (10) Patent No.: US 9,043,603 B2
(45) Date of Patent: *May 26, 2015

(54) SECURITY THRESHOLD ENFORCEMENT IN ANCHOR POINT-BASED DIGITAL RIGHTS MANAGEMENT

(75) Inventor: Paul Marvin Sweazey, Lyons, CO (US)

(73) Assignee: Seagate Technology LLC, Cupertino, CA (US)

( * ) Notice: Subject to any disclaimer, the term of this patent is extended or adjusted under 35 U.S.C. 154(b) by 1527 days.

This patent is subject to a terminal disclaimer.

(21) Appl. No.: 12/360,811

(22) Filed: Jan. 27, 2009

(65) Prior Publication Data

US 2009/0193262 A1    Jul. 30, 2009

Related U.S. Application Data

(60) Provisional application No. 61/024,174, filed on Jan. 28, 2008.

(51) Int. Cl.
*G06F 21/00* (2013.01)
*H04L 9/08* (2006.01)

(52) U.S. Cl.
CPC .............. *H04L 9/08* (2013.01); *H04L 9/0894* (2013.01); *H04L 2209/603* (2013.01)

(58) Field of Classification Search
CPC .... H04L 9/08; H04L 9/0894; H04L 2209/603
USPC .......... 713/182, 150, 165, 181; 705/901, 902; 380/277
See application file for complete search history.

(56) References Cited

U.S. PATENT DOCUMENTS

| | | | | |
|---|---|---|---|---|
| 6,047,262 | A * | 4/2000 | Lutz ................................ | 705/16 |
| 6,865,551 | B1 * | 3/2005 | Stefik et al. .................... | 705/51 |
| 8,625,788 | B2 * | 1/2014 | Pendakur et al. ............. | 380/200 |
| 2003/0198350 | A1 * | 10/2003 | Foster et al. ................... | 380/281 |
| 2005/0120232 | A1 * | 6/2005 | Hori et al. ...................... | 713/193 |
| 2006/0041752 | A1 * | 2/2006 | Tuvell et al. ................... | 713/171 |
| 2006/0085646 | A1 * | 4/2006 | Cutter et al. ................... | 713/175 |
| 2006/0143693 | A1 * | 6/2006 | Glickman ......................... | 726/3 |
| 2006/0235801 | A1 * | 10/2006 | Strom et al. .................... | 705/59 |
| 2006/0262927 | A1 * | 11/2006 | Rutkowski et al. ........... | 380/201 |
| 2008/0301461 | A1 * | 12/2008 | Coulier et al. ................. | 713/184 |
| 2009/0016533 | A1 * | 1/2009 | Jung et al. ...................... | 380/277 |
| 2009/0060182 | A1 * | 3/2009 | Killian et al. .................. | 380/201 |
| 2009/0176566 | A1 * | 7/2009 | Kelly .............................. | 463/29 |
| 2009/0202068 | A1 * | 8/2009 | Qureshi et al. ................. | 380/44 |

* cited by examiner

*Primary Examiner* — Abu Sholeman
(74) *Attorney, Agent, or Firm* — Cesari & Reed LLP; Kirk A. Cesari; Christian W. Best (57) ABSTRACT

Digital rights management (DRM) can be effectively implemented through use of an anchor point and binding records within a user's anchor point domain. Assigning security levels to various components within an anchor point based DRM system and evaluating them against a security criterion provides additional protection against authorized access of the digital content. The content provider may specify the security criterion (e.g., a security level threshold), and the ability to use the digital content is denied or granted based on the ability of components to satisfy this criterion. For example, the ability to use a digital property instance is granted to a content handler that satisfies the security criterion and denied to a content handle that does not satisfy the security criterion.

18 Claims, 6 Drawing Sheets

SECURITY THRESHOLD ENFORCEMENT IN ANCHOR POINT-BASED DIGITAL RIGHTS MANAGEMENT

CROSS REFERENCE

This application claims priority to U.S. Provisional Patent Application No. 61/024,174, entitled ANCHOR POINT-BASED DIGITAL RIGHTS MANAGEMENT and filed on Jan. 28, 2008, which is specifically incorporated by reference for all that it discloses and teaches.

BACKGROUND

Digital property is an evolving economic and legal concept that challenges modern technological and legal frameworks. Generally, digital property refers to any digital data that has some manner of ownership attached to it, for example, through copyright protection, trade secret protection, etc. In a typical copyright scenario, copyrights in an original work of authorship (e.g., a photograph) may be attributed to the author (e.g., the photographer). Furthermore, the work may be embodied in the form of digital data (e.g., a digital image file), the copying, distribution, derivation, etc. of which are exclusively within the rights of the author. Accordingly, each instance of the digital data (e.g., each copy of the digital image file) is an instance of the digital property of that author.

The exclusive rights associated with digital property may be transferred (e.g., assigned to another) or licensed for use by others. For example, the photographer may license another party to use a digital image on the party's website, subject to certain limitations to which the parties have agreed. However, once the digital image file is transferred out of the author's control, there is substantial risk of unauthorized copying, use, modification and distribution. Accordingly, Digital Rights Management (DRM) technologies are continually being developed to facilitate the owner's technological and legal control of his or her digital property rights.

Existing DRM approaches to facilitate the owner's technological and legal control of digital property instances have proven inadequate, costly, invasive, and inconvenient to the licensed users and/or digital property owners (e.g., being subject to technological breakdowns, such as computer crashes, resulting in a loss of a licensed copies), thereby limiting the widespread acceptance of these approaches. Accordingly, digital property ownership remains exposed to violations of the owner's property rights (e.g., from copying of the digital property by others), and furthermore, consumers remain suspicious of protected digital property. Moreover, components in a DRM-compliant system may possess varying levels of security (e.g., connecting a very secure media player to a very unsecure display monitor). As such, the characteristics of the user's device components can inherently compromise a content provider's ability to control the use of its protected content. These incompatible factors amplify the transactional costs associated with distributing digital content. In turn, digital property owners/publishers charge higher licensing fees to offset losses caused by digital property theft and consumers find the convenience of unauthorized digital content worth the ethical violations and possible criminal sanctions implicated by obtaining the content through theft. The cycle feeds on itself.

SUMMARY

The technology described herein binds the transferred rights to a secure, unique, hard-to-falsify physical object (called an "anchor point"). In one implementation, an anchor point is embodied in a highly secure, robust circuit device. The rights are secured in association with the physical anchor point rather than any individual instance of the digital property—the rights are bound to a binding record maintained by the physical secure anchor point device. The logical scope or "domain" in which an anchor point controls access to digital content is called the "anchor point domain". Absent the physical anchor point (e.g., outside of the anchor point domain), the digital property is unusable.

Furthermore, traditional and future DRM approaches may be applied within an anchor point domain to manage the specific rights available, but the rights to use the digital property cannot easily leak outside the user's anchor point domain. Accordingly, the difficulty in mass digital property theft increases dramatically, which may encourage digital property publishers to lower prices.

Additionally, access to a digital property instance may be managed through use of a security level structure whereby digital content may be passed only to components within the user's anchor point domain that have a security level sufficient to be deemed trusted. Security level enforcement further protects against the possibility of access keys to digital content being intercepted and "leaking" outside the user's anchor point domain, which would otherwise allow unauthorized parties access to the digital content.

In one implementation, the instance of the digital property is typically an encrypted digital data file, object, or stream. Given the appropriate encryption key and security level, a content handler (e.g., a media player) can gain access to the digital property instance and present (e.g., play) it to a user within the rights granted in association with the anchor point. To obtain the appropriate decryption key, the content handler resides within the user's anchor point domain, such that it has access to the anchor point. That is, the rights are managed through and bound to the anchor point, rather than the digital property instance or some communication connection with a DRM service of the publisher, thereby increasing the convenience to the user. Before transmitting the appropriate decryption key to the content handler, the anchor point checks the content handler's security level. If the security level of the content handler and the anchor point are greater than or equal to a threshold security level defined in the anchor point by the content provider, the anchor point allows transmission of the appropriate decryption key to the content handler. As such, the user may make as many copies of the digital property instance as he or she wants, but each copy is only usable if the content handler has access to the unique data managed by the anchor point and has a sufficient security level to obtain the appropriate decryption key from the anchor point.

The unique binding data, herein referred to as a binding record, may be stored in a device's anchor point and may limit a user's access to digital property instances by limiting access to an associated decryption key. Furthermore, a security level threshold may be defined for a digital property instance and linked to the binding record. In one implementation, a content provider defines the security level threshold in the anchor point during the consumer's acquisition of the digital property instance.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTIONS

Digital data is inherently copy-able. Legitimate copying (i.e., under most licensing schemes) is allowable, for example, to use the digital data (e.g., copying from a hard disc into memory), to prevent loss (e.g., backing up the digital data to one or more types of storage media), to allow mobility (e.g., to transfer to a new computer, mobile device, etc.), etc. In one implementation, this continued control is achieved through use of a secure device referred to herein as an "anchor point." Furthermore, to provide additional security and flexibility for a digital property owner, access to the digital property can be limited through enforcement of security levels associate with a user device.

An anchor point is a highly secure circuit device that may be incorporated into a computing device, such as a computer, a mobile phone, a hard drive, a monitor, an audio player or component, a set top box, a network appliance, a personal digital assistant (PDA), a television, a digital picture frame, etc. An anchor point may be part of a local consumer device or it may be provided by a remote server through an online service.

A security level is a value that quantifies the effort and resources required to compromise the component's security to reveal a secret or to behave in a way that violates its procedural restrictions. If the component has been rated with a particular security level, that security level is specified in a digital certificate stored with the component. The security level of a transaction session between components that have different security levels is considered to be the security level of the component with a lower security level.

Figure 1:
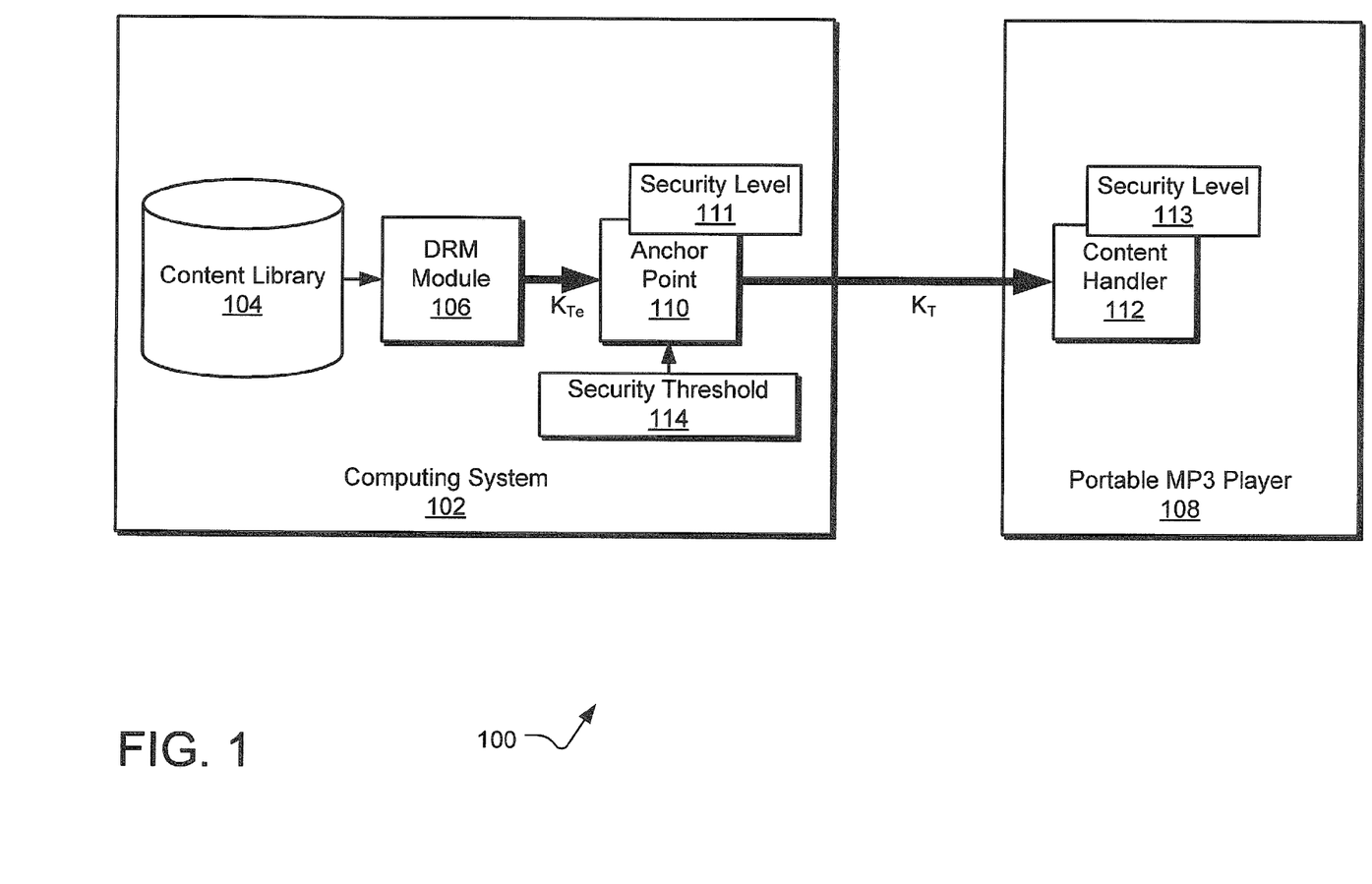
FIG. 1 illustrates example security level enforcement in an anchor point based digital rights management environment.

FIG. 1 illustrates example security level enforcement in an anchor point based digital rights management environment 100. A computing system 102 (e.g., a desktop computer) contains a content library 104 that stores encrypted digital property instances and associated rights objects provided by a content provider (not shown).

A digital rights management (DRM) module 106 processes a rights object from the content library 104 to determine the type of use in a digital property instance available to the user. For example, the user may have "purchased" the rights to listen to an audiobook on his or her portable MP3 player 108, provided the components satisfy certain security requirements (e.g., a security threshold) specified by the content provider.

If the DRM module 106 determines that the rights object allows the user to use the digital property instance, then it passes a title pre-key ($K_{Te}$) to a secure anchor point 110. The secure anchor point 110 is assigned a security level 111 (e.g., by a security level certification authority service (not shown)). Based on a security level evaluation performed by the secure anchor point 110, a title key ($K_T$) for decrypting the encrypted digital property instance from the content library 104 may be passed to a content handler 112, which is also assigned a security level 113 (e.g., by a security level certification authority service). If the security levels 111 and 113 satisfy a security criterion (e.g., security threshold 114), then the anchor point 110 passes the title key to the content handler 112 for use in the portable MP3 player 108. For example, the computer system 102 can upload an encrypted digital music file and a title key for the encrypted digital music file to the portable MP3 player 108 to allow the user to play the digital music file on the portable MP3 player 108. Alternatively, if the security levels 111 and 113 do not satisfy the security criterion, then the anchor point 110 does not pass the title key to the content handler 112. For example, the computer system 102 can upload the encrypted digital music file to the portable MP3 player 108 but withhold the title key, making the encrypted digital music file unusable by the portable MP3 player 108. If the security level 111 or 113 is improved or the security criterion is adjusted, the portable MP3 player 108 may later receive the title key so that the user can use the digital music file.

In one implementation, the security criterion is implemented using a security threshold 114 set by a content provider (e.g., the vendor of the digital property instance) and stored in association with a binding record in the secure anchor point 110. To determine whether its connection with a content handler 112 satisfies the security criterion, the anchor point 110 learns the security level 113 of the content handler, selects the lower of the security level 111 and the security level 113, and compares this selected security level to the security threshold 114. If the selected security level equals or exceeds the security threshold 114, then the anchor point 110 passes the title key to the content handler 112. If the selected security level does not equal or exceed the security threshold 114, then the anchor point 110 does not pass the title key to the content handler 112.

Figure 2:
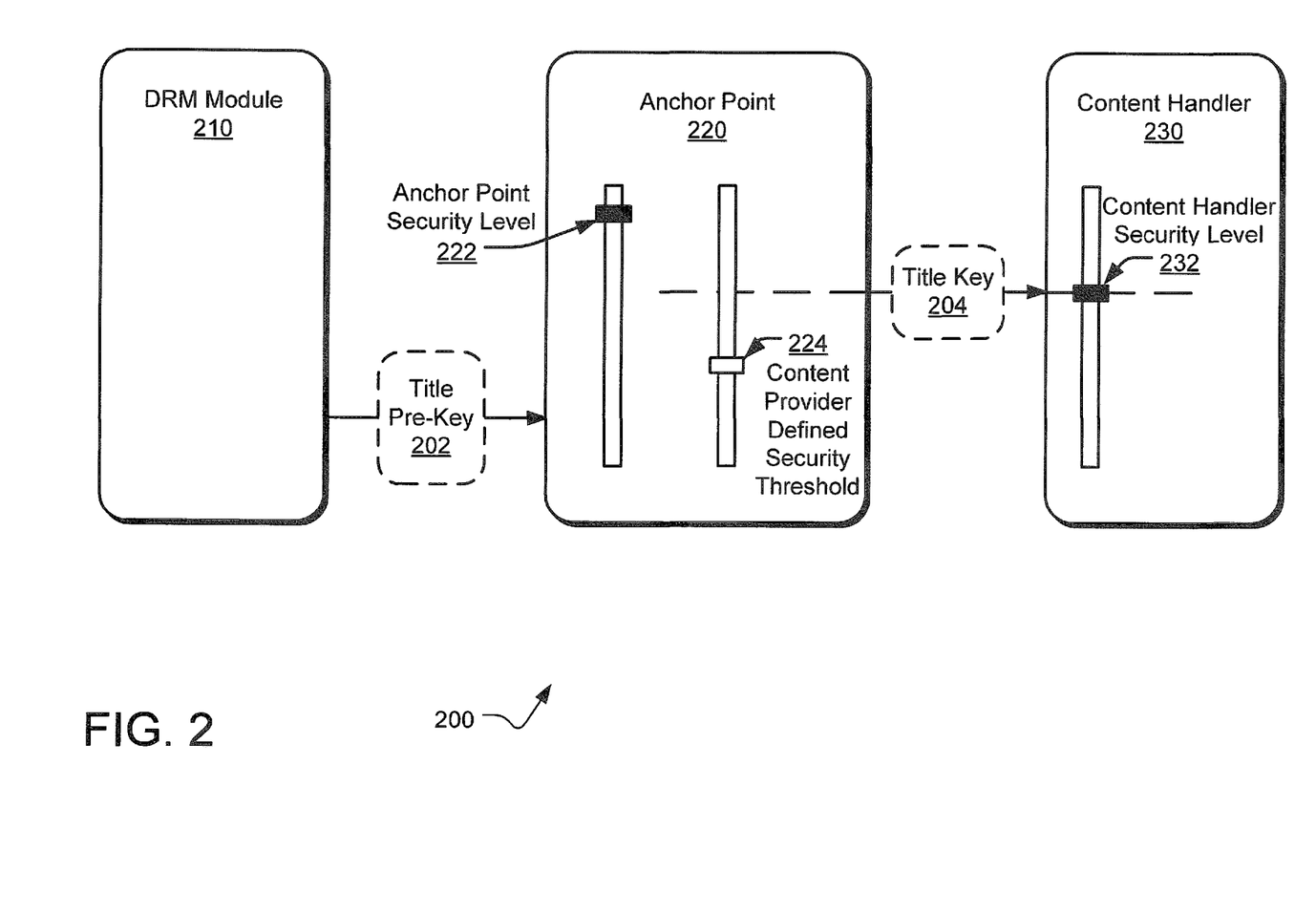
FIG. 2 illustrates an example anchor point based digital rights management environment capable of facilitating security level enforcement.

FIG. 2 illustrates an example anchor point based digital rights management environment 200 capable of facilitating security level enforcement. Within an anchor point based digital rights management environment of one implementation, digital property may only be used by a user through decrypting a digital property instance with a title key, although other implementations may be employed. Depicted in FIG. 2 is the retrieval of a title pre-key 202 from a DRM module 210 and subsequent transmission of a title key 204 to a content handler by an anchor point 220 in the anchor point based digital rights management environment 200. It should be understood that each of the components/modules of the anchor point based digital rights management environment 220 may be implement in software modules, circuitry, or combinations thereof.

Connections between components/modules (e.g. between the DRM module 210 and the anchor point 220) may be performed over secure communications links. Generally, a secure communications link is characterized by mutual authentication by public key certificate exchange, session key agreement, and subsequent communication using symmetric encryption, although other secure communications may also be employed.

Each component in the anchor point based digital rights management environment 200 may have a predefined security level, particularly the anchor point 220 and the content handler 230. In one implementation, the components receive the pre-defined security levels from an anchor point certification authority, although other sources of security level assignments may be employed. The anchor point certification authority may be an agency that is trusted by the content handler to judge the component's security level. A security level quantifies the effort and resources needed to compromise the component's security by, for example, revealing a secret or key or by behaving in a way that violates procedural restrictions. If a security level is not assigned to a component, then the security level may be assumed to be the least secure level in one implementation.

Turning more specifically to the implementation illustrated in FIG. 2, an anchor point 220 and a content handler 230 are presented with their respective security levels (222 and 232) depicted by a scale with the black bar indicating the level of security. As depicted, the higher the black bar is placed on the scale, the more trusted the component is and therefore the higher the predefined security level is. For example, the content handler security level 232 is shown as being lower than the anchor point security level 222.

In one implementation, the anchor point 220 will not transmit the title key 204 to the content handler 230 unless the content handler 230 and the anchor point 220 have security levels greater than or equal to a security threshold known to the anchor point 220. In one implementation, a content provider provides the security threshold 224 to be stored in the anchor point and associated with the binding key that facilitates access to the digital property instance provided by the content provider. In such an implementation, the content provider defined security threshold 224 is used to define the threshold security level that the content handler security level 232 should meet or exceed before the anchor point 220 may transmit the title key 204 to the content handler 230.

Figure 3:
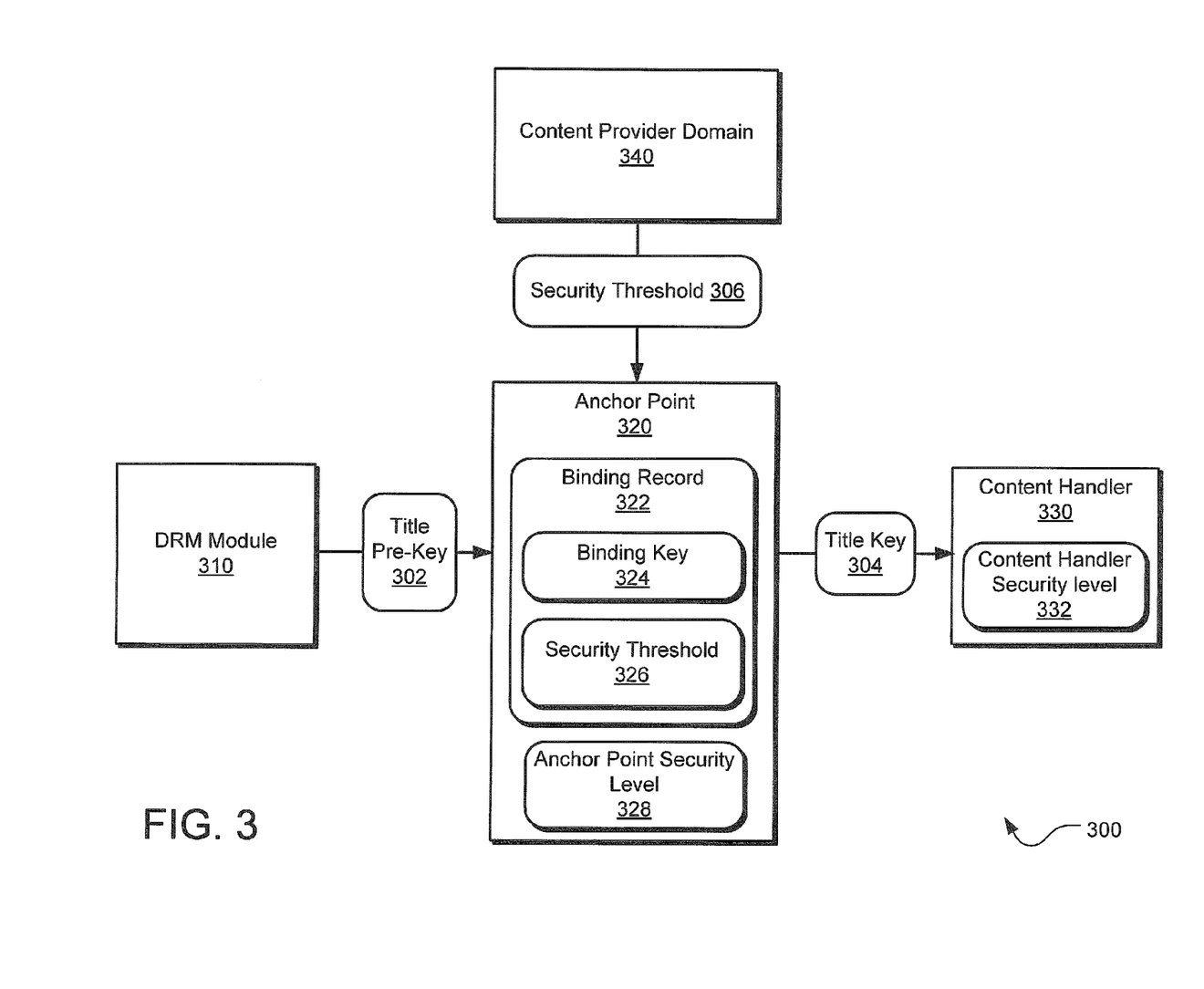
FIG. 3 illustrates a more detailed example anchor point based digital rights management environment capable of facilitating security level enforcement.

FIG. 3 illustrates a more detailed example anchor point based digital rights management environment 300 capable of facilitating security level enforcement. Any entity with access to a title key can use the associated digital property instance. Therefore, to provide the digital property owner further protection against a digital property instance title key "leaking" from the anchor point based digital property management environment 300, a security level enforcement structure may be implemented within the user's anchor point domain. In such an implementation, a content provider 340 transmits a security threshold 306 to an anchor point 320 to be stored in binding record 322 as security threshold 326 and associated with binding key 324.

In operation, a DRM module 310 transmits a title pre-key 302 to an anchor point 320. Using the title pre-key 302, the anchor point 320 accesses binding record 322 to retrieve the binding key 324 and the security threshold 326. The anchor point then generates a title key 304 by applying the binding key 324 to the title pre-key 302. Before transmitting the title key 304 to the content handler 330, the anchor point 320 checks the predefined content handler security level 332. (Note: These steps may be implemented in alternative orders.) If the content handler security level 332 and the anchor point security level 328 both meet or exceed the security threshold 326, then the anchor point transmits the title key 304 to the content handler 330. The content handler 330 may then decrypt a digital property instance associated with the title key 304 for use by a trusted user.

Figure 4:
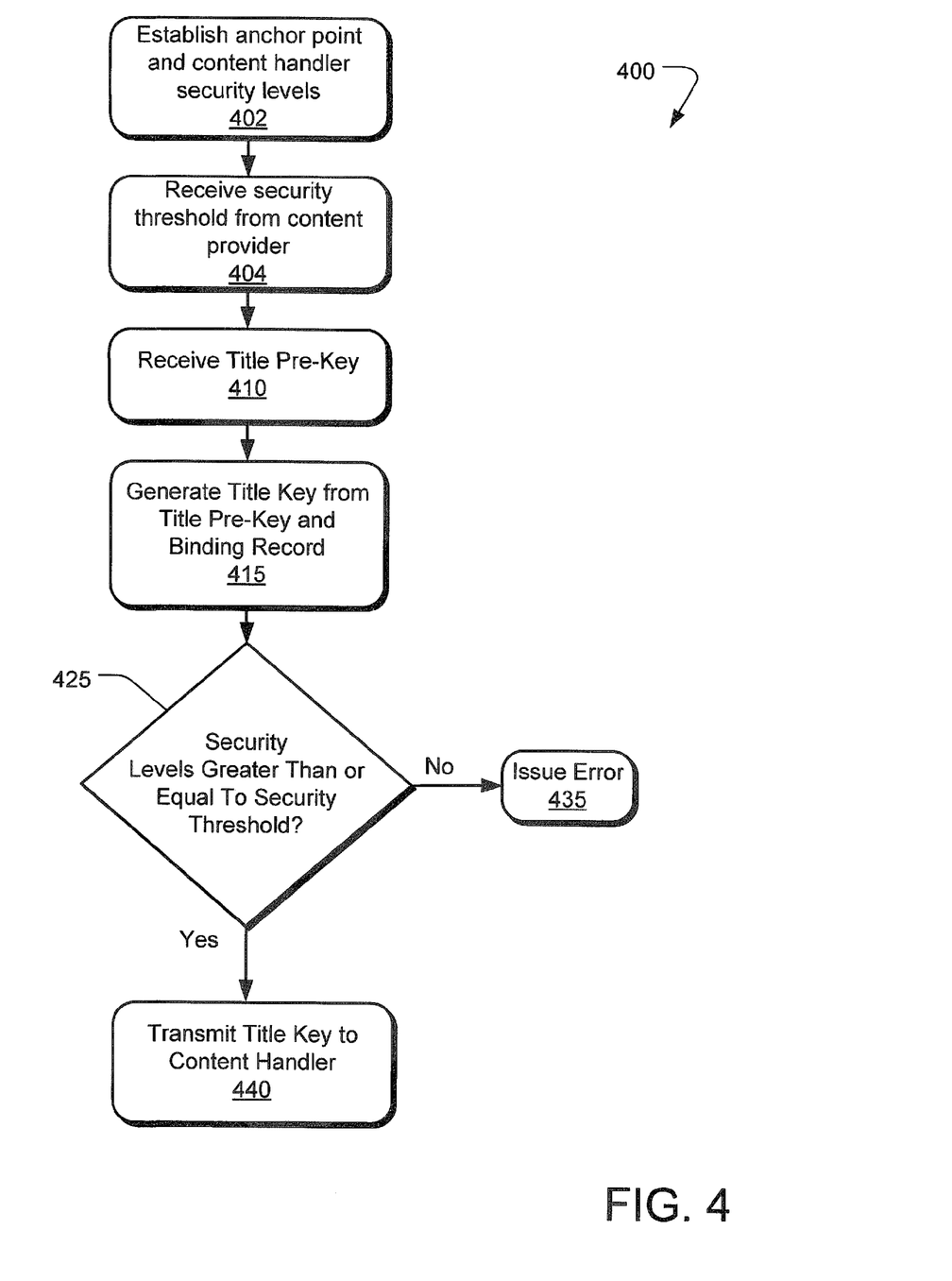
FIG. 4 illustrates example operations for enforcement of security levels in an anchor point based digital rights management environment.

FIG. 4 illustrates example operations for enforcement of security levels in an anchor point based digital rights management environment 400. In the implementation depicted in FIG. 4, a title key is generated in the anchor point from a title pre-key received from a DRM module and transmitted to a content handler upon a determination that the applicable security threshold is met in the content handler. In one implementation, operations performed by the DRM module may be performed by other components in a user's anchor point domain, such as but not limited, to the data storage, the anchor point, etc.

Referring to FIG. 4, a security level operation 402 establishes security levels in the anchor point and the content handler. In one implementation, the security levels are established through a digital certificate provided by a security level certificate authority, although other sources of security level assignments may be employed. The security level certification authority for the anchor point is an agency that is trusted by the content provider to judge the anchor point's security characteristics. Likewise, the security level certification authority for the content handler is an agency that is trusted by the content provider to judge the content handler's security characteristics. A security level quantifies the effort and resources needed to compromise the component's security by, for example, revealing a secret or key or by behaving in a way that violates procedural restrictions.

A security criterion operation 404 receives a security threshold from a content provider, although other security criterion may be employed. For example, when a user "purchases" a digital property instance from a content provider, the content provider designates a security threshold required to use the digital property instance and securely communicates this security threshold to the anchor point. In one implementation, the anchor point stores the content provider assigned security threshold in or in association with the binding record for the digital property instance. If the anchor point does not have a content provider defined security threshold associated with the binding key, then the anchor points sets the security threshold to the value of the lowest security level.

A receiving operation 410 receives a title pre-key from a digital rights management (DRM) module. A generation operation 415 generates a title key from the title pre-key and a binding key stored in the binding record for the digital property instance, although in some implementations, the generation operation 415 is delayed until a security level evaluation of decision operation 425 is successfully completed.

The decision operation 425 compares the content provider defined security threshold with the security level of the content handler. If the security levels of the content handler and the anchor point are both greater than or equal to the content provider defined security threshold, then the anchor point transmits the title key to the content handler at transmission operation 440. By contrast, if a security level of the content handler or anchor point is less than the content provider defined security threshold, then the anchor point does not transmit the title key to the content handler and issues an error message at error operation 435. Alternatively, the anchor point can silently refuse to issue the title key to the content handler if the security criterion is not satisfied.

Figure 5:
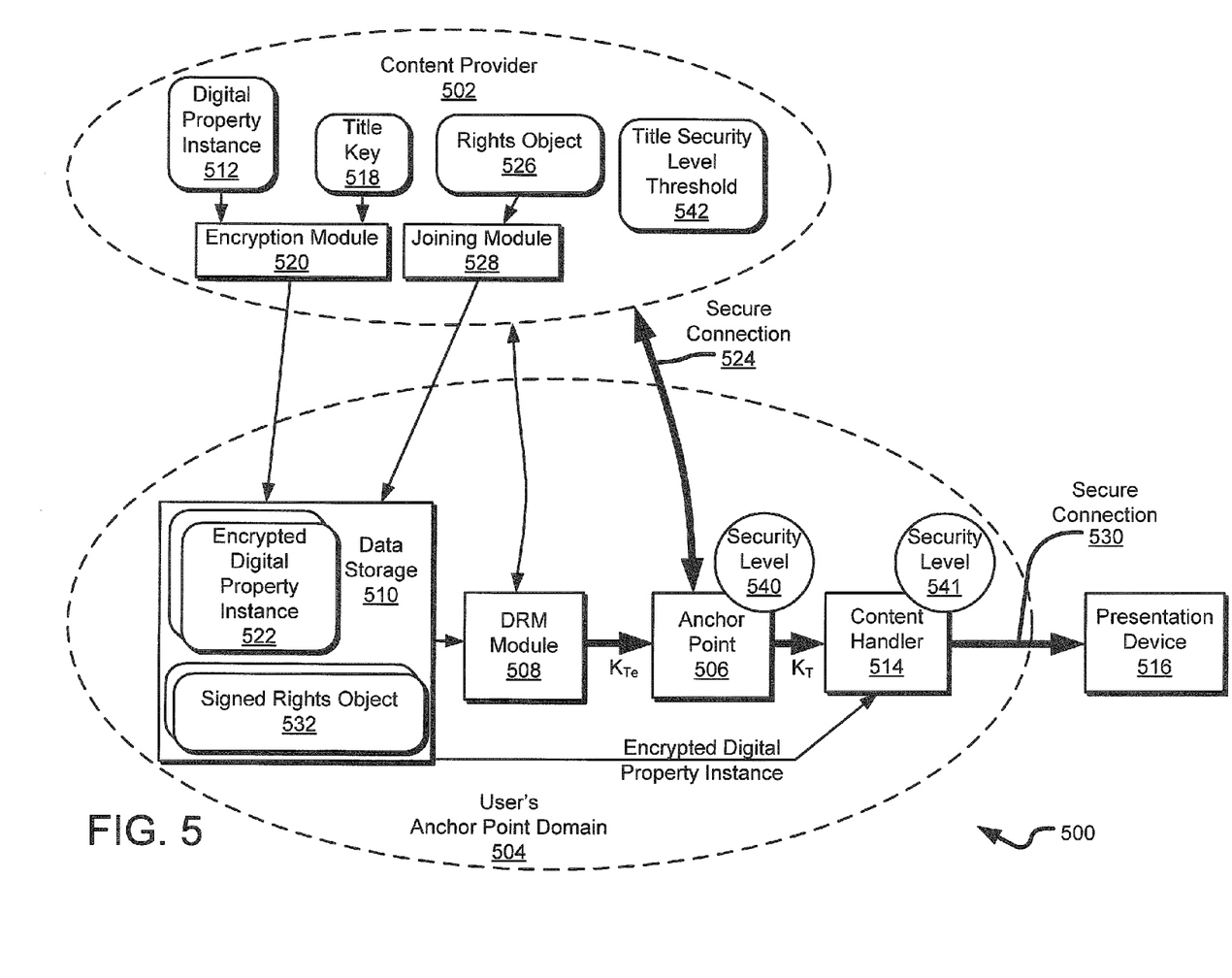
FIG. 5 illustrates an example architecture of anchor point based digital rights management environment capable of facilitating security level enforcement.

FIG. 5 illustrates an example architecture of anchor point based digital rights management environment 500 capable of facilitating security level enforcement to protect against unauthorized access to digital content by untrustworthy entities. A content provider 502 operates in a secure environment, from which the content provider 502 can issue content in the form of digital property instances 512 (or copies). Generally, the content provider 502 interacts with a user within the user's anchor point domain 504 to provide a uniquely encrypted instance of digital property and a signed rights object 532 associated with the digital property instance to declare the licensed rights obtained by the user. Within the user's anchor point domain 504, an anchor point 506, a DRM module 508, and data storage 510 work with the content provider 502 to create and transfer the uniquely encrypted instance of the digital property and the signed rights object 532 to the user's anchor point domain 504. Thereafter, the content provider 502 need not be involved, although in some implementations, the content provider 502 may become involved again in the future (e.g., to obtained updates to the digital property instance, to obtain replacements of the digital property instance, etc.).

After the encrypted digital property instance 522 and the signed rights object 532 are transferred to the user's anchor point domain 504, the anchor point 506, the DRM module 508, and data storage 510 work together (without the need to contact the content provider 502) to generate a key to allow a content handler 514 (e.g., a media player device or software component) and a presentation device 516 (e.g., a display device or sound card) to decrypt and present (e.g., play or display) the digital property instance 512 to the user. So as to avoid unauthorized access of the digital property instance, the user's anchor point domain 504 may use security levels for components within the user's anchor point domain 504.

Turning more specifically to the implementation illustrated in FIG. 5, assume the content provider receives a request from the user for specific content. The content (e.g., a digital video title) is a form of a digital property that can be embodied in a digital property instance 512 (e.g., a digital video file) from within the content provider 502. Typically, the user and content provider will agree on the licensing terms of the transfer, which may represent a broad range of possible transfers. For example, the user may request a 24 hour "rental" of a digital movie title or a perpetual license to play a digital audio title. A goal of the content provider is to transfer a secure instance of the requested title to the user with confidence that the user will only be able to use the title in accordance with the agreed upon terms.

In the first stage, that of transferring the digital property instance and rights object to the user's anchor point domain 504, the content provider 502 chooses a random title key 518 ($K_T$), which is generally expected to be unique among all users and transferred digital property instances, even those associated with the same content title. The content provider 502 encrypts the digital property instance 512 with the title key 518 via an encryption module 520 to yield an encrypted title instance 522, which is communicated (e.g., downloaded) to the data storage 510 in the user's anchor point domain 504 through wired networking, wireless networking, or physical means (e.g., "sneaker net").

In one implementation, the content provider 502 also contacts the user's anchor point 506 via a secure connection 524 to obtain a title pre-key. In one specific approach employed over a network, when the user initially requests the content title instance, he or she provides a URL to his or her anchor point 506. The content provider 502 uses this URL to locate the anchor point 506 over the network and to establish the secure connection 524.

The content provider 502 then sends the title key 518 to the anchor point 506 through the secure connection 524. In one implementation, the content provider 502 sends the title key 518 using a create_binding( ) function. Responsive to receipt of the create_binding( ) call, the anchor point 506 generates a binding record, including data such as a binding record identifier (ID), a binding record passkey, a binding key, one or more signing keys, a security threshold, etc. The anchor point 506 encrypts the title key using the binding key (randomly generated by the anchor point 506) to yield the title pre-key ($K_{Te}$), which is returned to the content provider 502 via the secure connection 524. The anchor point 506 also sends the binding record ID and binding record passkey to the content provider 502 to be embedded in a rights object. At this point, the content provider 502 no longer needs the title key and may delete it from its storage.

The content provider 502 also requests a DRM key from the DRM module 508 in the user's anchor point domain 504. The content provider 502 uses the DRM key to encrypt the title pre-key to yield a license key. The license key may accompany a definition of licensed rights (e.g., in an XML file) to be associated with the transferred encrypted digital property instance 522. The content provider 502 embeds the license key, the binding record ID, and the binding record passkey into the licensed rights definition to yield a rights object 526. Secret information, such as passkeys, may be encrypted prior to being embedded into a rights object, using some user-supplied secret, so that the user has control over who can access the licensed content.

The rights object 526 is then sent to the anchor point 506 through the secure connection 524 to be signed by a signing key (randomly generated by the anchor point 506) in order for the anchor point 506 to be able to verify that the rights object 526 has not been tampered with. In one implementation, the type of signature used is based on symmetric encryption and is more typically called a message authentication code (MAC). In this implementation, because the anchor point 506 does both the signing and checking, a MAC is appropriate because the anchor point 506, which is both the signer and the checker, knows the signing key. As such, the signing key does not need to be shared outside of the anchor point 506.

The anchor point's signature is then returned to the content provider 502 via the secure connection 524, joined to the rights object 526 by a joining module 528, and transferred to the data storage 510 in the user's anchor point domain 504. The content provider 502 may then recede into the background, as the content provider no longer needs to be involved in the user's use of the digital property instance 522—the user's anchor point domain 504 has all it needs to use the digital property instance 522. Nevertheless, the content provider 502 may return to the scene to provide beneficial services, including updating and/or replacing digital property instances, etc.

In one specific approach using a MAC, the content provider 502 may build a rights object 526, in which it may embed the title pre-key, and pass the rights object 526 to the anchor point 506 for signing. In response, the anchor point 506 randomly generates a signing key that is stored with the binding record for the current title instance and returns the signature to the content provider 502, where the signature is joined through a joining module 528 with the rights object 526 and transferred to the data storage 510 of the user's anchor point domain 504.

In one alternative implementation, when setting up the binding, the content provider 502 generates a title pre-key, instead of a title key, and sends the title pre-key to the anchor point 506, which generates the title key and returns it to the content provider 502 for use in encrypting the digital property instance 512. In this implementation, the anchor point 506 decrypts the content provider-provided title pre-key using a binding key to obtain the title key that may be securely sent to the content provider 502 for use in encrypting the digital property instance 512. Then, during usage, when the user attempts to decrypt and present the encrypted title instance, the anchor point receives the title pre-key from the DRM module and decrypts the title pre-key using its binding key to obtain the title key.

In yet another alternative implementation, the anchor point 506 generates both the title key and the title pre-key, providing these to the content provider 502.

In a second stage, having obtained the encrypted title instance 512 and the signed rights object 532, and having generated a binding record in the anchor point 506, the user's anchor point domain 504 can re-generate a title key required to present the content to the user. In one implementation, the stream of title keys are presented to the content handler 514, which decrypts portions of the digital property instance using these keys. For example, a video file may require decryption by a new title key every 10 frames. As such, the anchor point 506 would provide a new title key every 10 frames to allow the content handler 514 to decrypt the next portion of 10 frames.

The DRM module 508 extracts the license key from the signed rights object 532 and decrypts it using the DRM module's DRM key to obtain the title pre-key. The DRM module 508 can also extracts the binding record ID and binding record passkey from the signed rights object 532. The DRM module 508 then passes the title pre-key, binding record ID, and the binding record passkey to the anchor point 506 assuming the DRM module 508 can confirm compliance with the licensed rights defined in the signed rights object 532. With the title pre-key and the binding record information, the anchor point 506 can access the appropriate binding record it is storing to re-generate the title key using its binding key (e.g., the anchor point 506 decrypts the title pre-key using the binding key to generate the title key) and can then pass the title key to the content handler 514 to allow decryption of the encrypted digital property instance 522 and presentation of the content. It should be understood that, in one implementation, the DRM module 508 passes a stream of title pre-keys to the anchor point 506 to allow the anchor point 506 to pass a stream of title keys to the content handler 514.

In one implementation, it is further in the interest of the content provider 502 to enforce security levels in components within the user's anchor point domain 504 that process the title key 518 (e.g. the content handler 514 and the anchor point 506). In such an implementation, the content provider 502 may specify a "security threshold" to the anchor point 506, which stores the threshold value in the binding record associated with the digital property instance 512. Furthermore, in the user's anchor point domain 504, certain components are characterized by security levels, which quantifies the effort and resources needed to compromise the component's security by, for example, revealing a secret or key or by behaving in a way that violates procedural restrictions.

In one implementation, a security level is specified by a digital certificate that is signed by a certification authority. The certification authority can be an agency that is trusted by the content provider to judge the component's security level. If a security level is not assigned to a component, then the security level of that component may be assumed to be the lowest security level.

A security level may also be assigned to a secure communication session between two components. In such an implementation, the secure session inherits the lower of the security levels of the two components. The anchor point 506 is free to create its own secure communication session labels, and computes session keys using, for example, a Diffie-Hellman key agreement protocol between the anchor point 506 and the component with which the anchor point 506 is communicating. For example, the security level of the secure session between the content handler 514 and the anchor point 506 would be that of the content handler 514 because the security level 541 of the content handler 514 is less than the security level 540 of the anchor point 506.

By way of example and not limitation, if the content handler 514 does not possess a security level 541 that satisfies the predefined security level threshold in the binding record stored by the anchor point 506, then the anchor point 506 refuses to share the title key 518 with the content handler 514. By contrast, if the security level attributed to the secure communications session between the anchor point 506 and the content handler 514 satisfies the security threshold, then the anchor point 506 may forward the title key 518 to the content handler 514.

Figure 6:
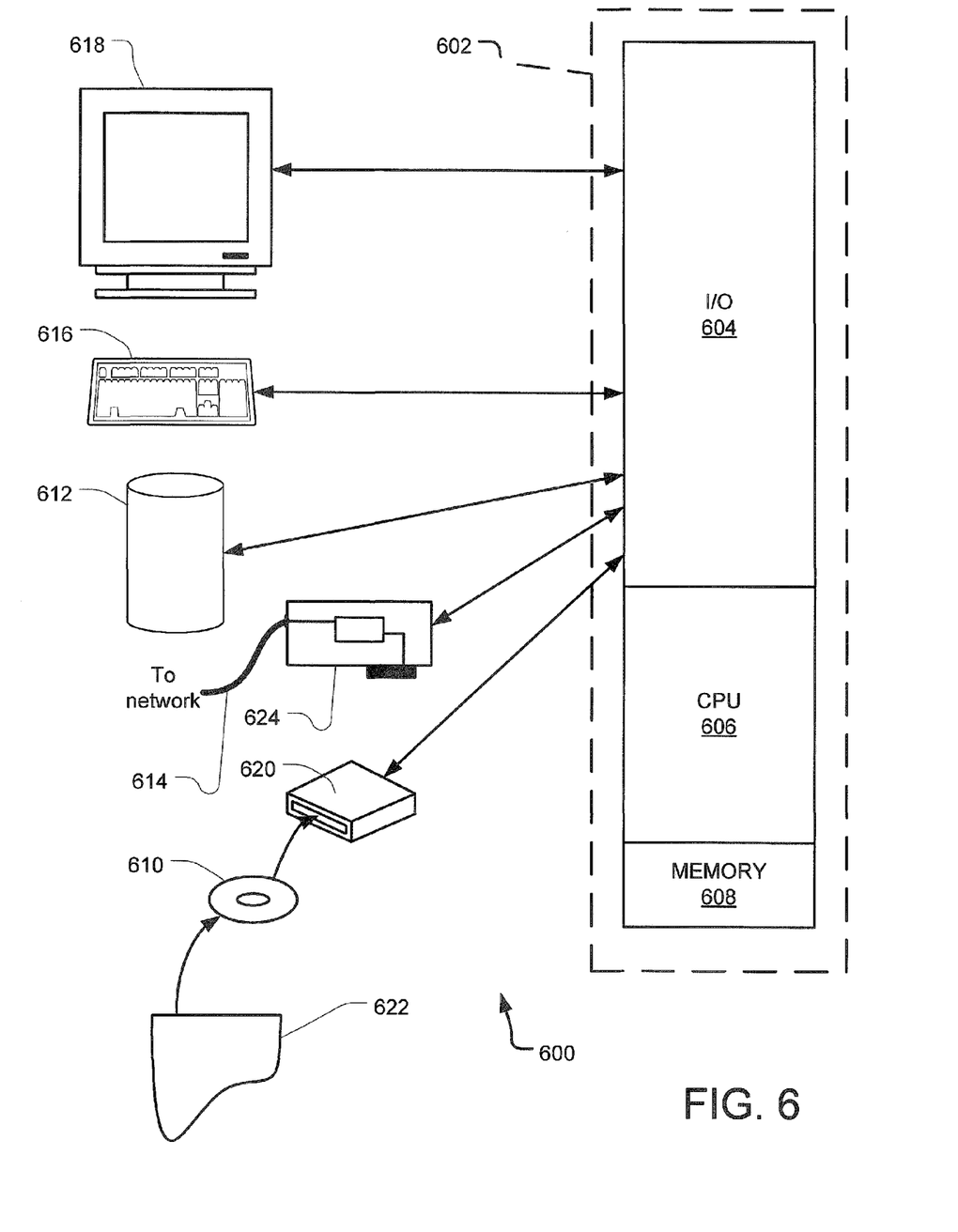
FIG. 6 illustrates an example system that may be useful in implementing the described technology.

FIG. 6 illustrates an example system that may be useful in implementing the described technology. A general purpose computer system 600 is capable of executing a computer program product to execute a computer process. Data and program files may be input to the computer system 600, which reads the files and executes the programs therein. Some of the elements of a general purpose computer system 600 are shown in FIG. 6 wherein a processor 602 is shown having an input/output (I/O) section 604, a Central Processing Unit (CPU) 606, and a memory section 608. There may be one or more processors 602, such that the processor 602 of the computer system 600 comprises a single central-processing unit 606, or a plurality of processing units, commonly referred to as a parallel processing environment. The computer system 600 may be a conventional computer, a distributed computer, or any other type of computer. The described technology is optionally implemented in software devices loaded in memory 608, stored on a configured DVD/CD-ROM 610 or storage unit 612, and/or communicated via a wired or wireless network link 614 on a carrier signal, thereby transforming the computer system 600 in FIG. 6 to a special purpose machine for implementing the described operations.

The I/O section 604 is connected to one or more user-interface devices (e.g., a keyboard 616 and a display unit 618), a disk storage unit 612, and a disk drive unit 620. Generally, in contemporary systems, the disk drive unit 620 is a DVD/CD-ROM drive unit capable of reading the DVD/CD-ROM medium 610, which typically contains programs and data 622. Computer program products containing mechanisms to effectuate the systems and methods in accordance with the described technology may reside in the memory section 604, on a disk storage unit 612, or on the DVD/CD-ROM medium 610 of such a system 600. Alternatively, a disk drive unit 620 may be replaced or supplemented by a floppy drive unit, a tape drive unit, or other storage medium drive unit. The network adapter 624 is capable of connecting the computer system to a network via the network link 614, through which the computer system can receive instructions and data embodied in a carrier wave. Examples of such systems include SPARC systems offered by Sun Microsystems, Inc., personal computers offered by Dell Corporation and by other manufacturers of Intel-compatible personal computers, PowerPC-based computing systems, ARM-based computing systems and other systems running a UNIX-based or other operating system. It should be understood that computing systems may also embody devices such as Personal Digital Assistants (PDAs), mobile phones, gaming consoles, set top boxes, etc.

When used in a LAN-networking environment, the computer system 600 is connected (by wired connection or wirelessly) to a local network through the network interface or adapter 624, which is one type of communications device. When used in a WAN-networking environment, the computer system 600 typically includes a modem, a network adapter, or any other type of communications device for establishing communications over the wide area network. In a networked environment, program modules depicted relative to the computer system 600 or portions thereof, may be stored in a remote memory storage device. It is appreciated that the network connections shown are exemplary and other means of and communications devices for establishing a communications link between the computers may be used.

In an exemplary implementation, anchor points, DRM modules, content handlers, and other components may be incorporated as part of the operating system, application programs, or other program modules or hardware components. Binding records, rights objects, digital property instances, various encryption keys, security levels and other data may be stored as program data.

The technology described herein is implemented as logical operations and/or modules in one or more systems. The logical operations may be implemented as a sequence of processor-implemented steps executing in one or more computer systems and as interconnected machine or circuit modules within one or more computer systems. Likewise, the descriptions of various component modules may be provided in terms of operations executed or effected by the modules. The resulting implementation is a matter of choice, dependent on the performance requirements of the underlying system implementing the described technology. Accordingly, the logical operations making up the embodiments of the technology described herein are referred to variously as operations, steps, objects, or modules. Furthermore, it should be understood that logical operations may be performed in any order, unless explicitly claimed otherwise or a specific order is inherently necessitated by the claim language.

The above specification, examples and data provide a complete description of the structure and use of example embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention. In particular, it should be understood that the described technology may be employed independent of a personal computer. Other embodiments are therefore contemplated. It is intended that all matter contained in the above description and shown in the accompanying drawings shall be interpreted as illustrative only of particular embodiments and not limiting. Changes in detail or structure may be made without departing from the basic elements of the invention as defined in the following claims.

Although the subject matter has been described in language specific to structural features and/or methodological arts, it is to be understood that the subject matter defined in the appended claims is not necessarily limited to the specific features or acts described above. Rather, the specific features and acts described above are disclosed as example forms of implementing the claimed subject matter.

What is claimed is:

1. A method comprising:
   learning a security level of a content handler coupled to an anchor point, the anchor point comprising a secure unique hard-to-falsify physical circuit that can store data, the security level including a value stored to a digital certificate of the content handler;
   receiving at the anchor point a title pre-key;
   decrypting the title pre-key with a binding key stored within the anchor point to yield a title key, the title key being configured to decrypt an encrypted digital property instance;
   establishing a security level in the anchor point, wherein the security level in the anchor point quantifies effort and resources needed to compromise security of the anchor point and is judged by a certification authority trusted by a content provider from which the encrypted digital property instance was received;
   determining a security level of a transaction based on the lowest of the security level in the anchor point and the security level of the content handler, including comparing the value of the security level of the content handler to a value of a security criterion associated with the digital property instance; and
   issuing the title key to the content handler when the value of the security level of the transaction satisfies the security criterion associated with the encrypted digital property instance.

2. The method of claim 1 further comprising:
   rating the content handler to designate the security level of the content handler, wherein the security level of the content handler quantifies effort and resources needed to compromise security of the content handler to reveal a secret or to behave in a way that violates procedural restrictions of the content handler, and is judged by a certification authority trusted by a content provider from which the encrypted digital property instance was received.

3. The method of claim 1 wherein the binding key is stored in a binding record associated with the encrypted digital property instance.

4. The method of claim 1 further comprising:
   generating the title key by decrypting the received title pre-key using the binding key stored within the anchor point, the binding key being stored in a binding record associated with the encrypted digital property instance.

5. The method of claim 1 wherein the security criterion is designated by a content provider from which the encrypted digital property instance was received.

6. The method of claim 1 wherein the security criterion specifies a security threshold that a security level must equal or exceed to satisfy the security criterion.

7. The method of claim 1 wherein the issuing operation comprises:
   evaluating the security level of the content handler against the security criterion.

8. The method of claim 1 further comprising:
   establishing the security level in the anchor point, wherein the issuing operation comprises issuing the title key to the content handler, if both the security level of the anchor point and the security level of the content handler satisfy the security criterion associated with the encrypted digital property instance.

9. A computer-readable storage device storing instructions, that when executed by a processor cause the processor to perform a method comprising:
   learning a security level of a content handler connected to an anchor point, the anchor point comprising a secure unique hard-to-falsify physical circuit that can store data, the security level including a value stored to a digital certificate of the content handler;
   receiving at the anchor point a title pre-key;
   decrypting the title pre-key with a binding key stored within the anchor point to yield a title key, the title key being configured to decrypt an encrypted digital property instance;
   establishing a security level in the anchor point, wherein the security level in the anchor point quantifies effort and resources needed to compromise security of the anchor point and is judged by a certification authority trusted by a content provider from which the encrypted digital property instance was received;

determining a security level of a transaction based on the lowest of the security level in the anchor point and the security level of the content handler, including comparing the value of the security level of the content handler to a value of a security criterion associated with the digital property instance; and issuing the title key to the content handler when the value of the security level of the transaction satisfies the security criterion associated with the encrypted digital property instance.

10. The computer-readable storage device of claim 9 wherein the security level of the content handler quantifies effort and resources needed to compromise security of the content handler and is judged by a certification authority trusted by a content provider from which the encrypted digital property instance was received.

11. The computer-readable storage device of claim 9 wherein the binding key is stored in a binding record associated with the encrypted digital property instance.

12. The computer-readable storage device of claim 9 wherein the method further comprises:

generating the title key by decrypting the received title pre-key using the binding key stored within the anchor point, the binding key being stored in a binding record associated with the encrypted digital property instance.

13. The computer-readable storage device of claim 9 wherein the security criterion is designated by a content provider from which the encrypted digital property instance was received.

14. The computer-readable storage device of claim 9 wherein the security criterion specifies a security threshold that a security level must equal or exceed to satisfy the security criterion.

15. The computer-readable storage device of claim 9 wherein the issuing operation comprises:

evaluating the security level of the content handler against the security criterion.

16. The computer-readable storage device of claim 9 wherein the method further comprises:

establishing the security level in the anchor point, wherein the issuing operation comprises issuing the title key to the content handler, if both the security level of the anchor point and the security level of the content handler satisfy the security criterion associated with the encrypted digital property instance.

17. A system comprising:

a content handler storing a security level attributed to the content handler;

a secure unique physical anchor point circuit communicatively coupled to the content handler and configured to:

establish a security level in the anchor point, wherein the security level in the anchor point quantifies effort and resources needed to compromise security of the anchor point and is judged by a certification authority trusted by a content provider from which an encrypted digital property instance was received;

determine a security level of a transaction based on the lowest of the security level in the anchor point and the security level of the content handler, including evaluate the security level of the content handler against a security criterion associated with the encrypted digital property instance;

issue a title key to the content handler when the security level of the transaction satisfies the security criterion; and the content handler is configured to decrypt the encrypted digital property instance using the title key.

18. The system of claim 17 further comprising:

a digital rights management circuit module communicatively coupled to pass a title pre-key to the anchor point, wherein the title pre-key can be decrypted by a binding key stored within the anchor point to yield the title key.

* * * * *